United States Patent
Schulz et al.

[11] Patent Number: 5,964,965
[45] Date of Patent: Oct. 12, 1999

[54] NANOCRYSTALLINE MG OR BE-BASED MATERIALS AND USE THEREOF FOR THE TRANSPORTATION AND STORAGE OF HYDROGEN

[75] Inventors: Robert Schulz, Sainte-Julie; John Strom-Olsen, Westmount; Leszek Zaluski; Alicja Zaluska, both of Montreal, all of Canada

[73] Assignees: Hydro-Quebec; McGill University, both of Montreal, Canada

[21] Appl. No.: 08/912,166

[22] Filed: Aug. 15, 1997

Related U.S. Application Data

[63] Continuation of application No. 08/382,776, Feb. 2, 1995, abandoned.

[51] Int. Cl.[6] .................................................. C22C 23/00
[52] U.S. Cl. .................. 148/420; 148/400; 148/665; 148/666; 148/667; 420/401; 420/402; 420/414; 420/900; 423/647
[58] Field of Search .................................. 148/420, 400, 148/665, 666, 667; 420/401, 402–414, 900; 429/59; 423/647

[56] References Cited

U.S. PATENT DOCUMENTS

| | | | |
|---|---|---|---|
| 4,214,699 | 7/1980 | Buchner et al. | 237/12.3 |
| 4,359,396 | 11/1982 | Maeland | 420/401 |
| 4,613,362 | 9/1986 | Welter et al. | 420/900 |

FOREIGN PATENT DOCUMENTS

| | | |
|---|---|---|
| 0 550 958 | 7/1993 | European Pat. Off. . |
| 0 671 357 | 9/1995 | European Pat. Off. . |

(List continued on next page.)

OTHER PUBLICATIONS

E. Ivanov, I. Konstanchuk, A Stepanov and V. Boldyrev, Magnesium Mechanical Alloys for Hydrogen Storage, Journal of Less Common Metals, vol. 131 (1987), pp. 25–29.

M.Y. Song, E. Ivanov, B. Darriet, M. Pezat and P. Hagenmuler, Hydriding and Dehydriding Characteristics of Mechanically Alloyed Mixtures Mg–x wt. %Ni (x=5, 10, 25 and 55), Journal of Less Common Metals, vol. 131 (1987), pp. 71–79.

A. Stepanov, E. Ivanov, I. Konstanchuk and V. Boldyrev, Hydriding Properties of Mechanical Alloys Mg–Ni, Journal of Less Common Metals, vol. 131 (1987), pp. 89–97.

(List continued on next page.)

*Primary Examiner*—Sikyin Ip
*Attorney, Agent, or Firm*—Foley & Lardner

[57] ABSTRACT

Disclosed is a very light-weight, Mg and Be-based material which has the ability to reversibly store hydrogen with very good kinetics. This material is of the formula $(M_{1-x}A_x) D_y$ wherein M is Mg, Be or a combination of them; A is an element selected from the group consisting of Li, Ca, Ti, V, Cr, Mn, Fe, Co, Ni, Cu, Zn, Al, Y, Zr, Nb, Mo, In, Sn, O, Si, B, C and F; D is a metal selected from the group consisting of Fe, Co, Ni, Ru, Rh, Pd, Ir and Pt (preferably Pd); x is a number ranging from 0 to 0.3; and y is a number ranging from 0 to 0.15. This material is in the form of a powder of particles of the formula $M_{1-x}A_x$ as defined hereinabove, having an average size ranging from 0.1 to 100 μm, each particle consisting of nanocrystalline grains having an average size of 3 to 100 nm or having a nano-layered structure with a layer spacing of 3 to 100 nm. Some of these particles have clusters of metal D attached thereto, with an average size ranging from 2 to 200 nm. Also disclosed are a process for preparing this material which has a very high hydrogen absorption capacity, and a method of use of the same for the transportation and/or storage of hydrogen and/or the storage of thermal energy.

21 Claims, 4 Drawing Sheets

FOREIGN PATENT DOCUMENTS 2 386 428   11/1978   France .
WO 94/12695   6/1994   WIPO .

OTHER PUBLICATIONS

Song et al., "Hydriding Properties Of A Mechanically Alloyed Mixture With A Composition $Mg_2Ni$", Int. Journ. Hydrogen Energy, vol. 10, No. 3, 1985, pp. 169–178.

Zaluski et al., "Hydrogen Absorption in Nanocrystalline $Mg_2Ni$ Formed By Mechanical Alloying", Journal of Alloys And Compounds, vol. 217, 1995—pp. 245–249.

Fecht et al. "Nanocrystalline Metals Prepared By High–Energy Ball Milling", Metallurgical Transactions A, vol. 21A, Sep. 1990, pp. 2333–2337.

Li et al., "A New Method For The Production Of Mg–Ni Hydrogen Storage Materials", Advanced Materials, vol. 5, No. 7/8, 1993, pp. 554–555.

NANOCRYSTALLINE MG OR BE-BASED MATERIALS AND USE THEREOF FOR THE TRANSPORTATION AND STORAGE OF HYDROGEN

This application is a continuation of application, now abandoned Ser. No. 08/382,776, filed Feb. 2, 1995.

BACKGROUND OF THE INVENTION a) Field of the Invention

The present invention relates to light-weight, Mg and Be-based materials of specific composition and structure, which have the ability to reversibly store hydrogen with very good kinetics.

The invention also relates to a process for preparing these materials and to their use for the transportation and/or storage of hydrogen and also for the storage of thermal energy.

b) Brief description of the prior art

It is known that some metallic alloys are able to absorb hydrogen in the reversible manner. Examples of alloys that can form hydrides reversibly, are FeTi, $LaNi_5$ and $Mg_2Ni$.

Thanks to their ability to absorb hydrogen, these alloys are particularly useful for storing hydrogen, since they have the following advantages:

(1) a large hydrogen storage capacity, which is even higher than that of liquid hydrogen, because of the higher volume density of hydrogen in hydrides due to the formation of hydrogen-metal bonds that allows hydrogen-to-hydrogen distance to be smaller than in liquid hydrogen;

(2) a reversibility of the hydride formation;

(3) an endothermal release of the hydrogen from the alloys, which reduces the safety problems; and (4) no need for an advanced technology to obtain hydrogen transfer to or from the alloys.

In spite of these advantages, the known alloys that are capable of absorbing hydrogen in a reversible manner have never been used on an industrial scale, because of the following difficulties.

(1) First of all, some alloys like $Mg_2Ni$ are not easy to prepare inasmuch as their phase diagram does not allow direct preparation of the alloy by mere cooling of a molten mixture of their constituting metals;

(2) Secondly, because of oxides that are formed on their surface when they are in contact with air, the known alloys must be activated in order to absorb hydrogen. The activation treatment consists in annealing the alloys for, several times at high temperature under vacuum and/or a high pressure of hydrogen. This treatment must be repeated every time the alloy is exposed to air.

(3) Moreover, during the absorption/desorption cycle, the known crystalline alloys usually fragment into small particles and loose their structural integrity. This results in a deterioration of the hydrogen absorption kinetic and in a heat transfer problem.

It is also known that, amongst the above mentioned alloys having the ability to reversibly store hydrogen, magnesium-based alloys are prime candidates for hydrogen storage and applications related to energy storage. As a matter of fact, pure magnesium can theoretically store a large amount of hydrogen (7.6 wt.%) in the form of hydride $MgH_2$. Such an amount is very attractive for hydrogen storage and much higher than the amounts of hydrogen that can be stored in the other alloys mentioned hereinabove, because magnesium is very light as compared to the other alloys mentioned hereinabove. Moreover, the formation of magnesium hydride has a large heat of reaction (75 kg/mol.). Because of the reversibility of the reaction, Mg-hydrogen systems can be effectively used for energy storage and related application, like hydrid heat pumps.

However, under normal conditions, magnesium does not react with hydrogen, because it oxidizes easily and MgO coating on the surface blocks the hydrogen uptake. Therefore magnesium is extremely difficult to activate and hydrogenate. By way of example, it has been found that to form magnesium hydride, a treatment under a hydrogen pressure of 150 atm at 300° C. for 150 h is required.

Because of the large nominal value of hydrogen uptake (7.6 wt.%) and the low cost of magnesium, continuous efforts have been made to overcome the above drawbacks, and more particularly to improve the hydrogenation kinetics. In the recent years, there have been two main trends in research to improve hydrogenation characteristics of magnesium.

The first one of these trends has been to alloy Mg with other elements like rare earth elements, to add In, Ni, Y or La to Mg-Al alloys, or to add transition metals to Mg-Ni alloys. Although there has been a considerable improvement in the hydrogenation kinetics observed for the alloys that were so prepared, the enhancement in kinetics has always been obtained at the price of a reduction in the maximum hydrogen capacity (reduced to a maximum 3–5 wt.%) and vice versa. Moreover, for many Mg-based alloys, the hydrogenation/dehydrogenation temperature is still about 350–400° C. to obtain reasonable kinetics.

The other trend in research has been to enhance the activity of magnesium by modification of it with organic compounds. For example, hydrogenation was performed in organic solvents, typically tetrahydrofurane (THF) using soluble organo-transition metal catalysts, or by co-condensation of Mg atoms with organic compounds (tetrahydrofurane, perylene). Although magnesium powders modified by chemical methods usually exhibit improved activity with no significant reduction of hydrogen capacity, the methods that have been devised to prepare them suffer from disadvantages. They are costly (for example, one of them calls for a high-vacuum system for powder condensation operating at 77K), and they are complicated. They are also unsafe and environmentally unfriendly if extended to a larger scale, because of the use of volatile and toxic organometallic catalysts. Moreover, the powders that are so-prepared are usually pyrophoric, thereby making it compulsory to provide protective atmosphere during handling.

In Canadian patent application No. 2,117,158 filed on Mar. 7, 1994 in the name of the same Applicants, Ni-based alloys have been disclosed, which are particularly efficient for use to reversibly store hydrogen.

These alloys are made of Ni and of another metal selected amongst Mg, La, Be and Li. They preferably consist of $Mg_{2-x}Ni_{1+x}$ wherein x is a number ranging from −0.3 to −0.3, or of $LaNi_5$.

In accordance with the invention disclosed in this Canadian application, it is compulsory that such alloys be in the form of a powder of crystallites having a grain size lower than 100 nm and preferably lower than 30 nm. Indeed, it has been found that if the selected alloy consists of crystallites having such a very low grain size, hydrogen absorption is much faster than with a similar polycrystalline alloy, even when this polycrystalline alloy is activated to eliminate the external layer of oxides which reduce its absorption kinetics.

In other words, it has been found that if use is made of a nanocrystalline powder of an alloy capable of absorbing hydrogen, such as $Mg_2Ni$ (which has the additional advantage of being also very light as compared to FeTi), it is not necessary to activate the powder to make it able to absorb hydrogen. At worst, a single activation treatment at low temperature is sufficient. Moreover, it has been discovered that the kinetics of absorption (diffusion of hydrogen throught the surface and within the alloy) are much faster since the nanocrystalline alloy has a very large number of grain boundaries and surface defects. It has further been discovered that the nanocrystalline alloys keep their structural integrity when they are subjected to absorption-desorption cycles, since the size of the crystallites is already lower than the typical size of grains after hydrogen decrepitation.

Therefore, the nanocrystalline alloys disclosed in this patent application have been found particularly useful and efficient for storing and/or transporting hydrogen. As a matter of fact, these alloys have the following advantages as compared to the corresponding polycrystalline alloys:
they are capable of absorbing hydrogen at temperatures lower than 200° C. without any activation (by way of comparison, the conventional crystalline magnesium-nickel alloys react with hydrogen only at temperature higher than 250° C. and after several activation cycles):
their activation is much easier to carry out (with the conventional $Mg_2Ni$ alloys, it is necessary to initiate hydrogen absorption at temperatures higher than 300° C., usually after several cycles at high temperatures under high pressure);
their are less subject to decrepitation (viz. they have a better structural integrity).

In Canadian patent application No. 2,117,158, there is also disclosed a very simple yet efficient process for preparing the above described nanocrystalline alloys directly from powders of the metals that form the alloy. This direct preparation is carried out in a very simple manner, by merely grinding at ambient temperature under an inert atmosphere, a mixture of a powder of Ni with a powder of the other metal of the alloy, in amounts selected to obtain the requested composition. To be efficient, this grinding must be intense and carried out under inert atmosphere. It allows the preparation by mechanical alloying of the alloy from powders of Ni and of the other metal and at the same time reduces the crystal size to the requested value.

From a practical standpoint, grinding can be carried out with a high energy ball milling machine. By way of examples of such ball milling machines, reference can be made to those sold under the trademarks SPEC 8000 or FRITCH.

In order to further improve the quality and efficiency of the nanocrystalline alloys disclosed herein above, Canadian application No. 2,117,158 further suggests to apply a material capable of catalysing the dissociation of the hydrogen molecule, such as, for example, palladium, directly onto the surface of the crystalline particles. This material can be applied in a very simple manner, by grinding for a much shorter period of time the pre-synthesized nanocrystalline particles with a powder of the catalyst material. Thus, one can grind the nanocrystalline alloy particles with a powder of Pd for a given time onto the surface of the nanocrystalline alloy particles.

If the nanocrystalline alloys disclosed in this Canadian patent application are very efficient as absorbent medium for storing hydrogen, they still have the drawback of being too heavy for many potential applications. For example, $Mg_2Ni$ with a volume density of 3.46 $g/cm^3$, which is much higher than that of gaseous or liquid hydrogen, has a capacity of absorption of hydrogen per mass unit (expressed in weight of absorbed hydrogen per weight of absorbent medium) equal to 3.8. However, such as capacity is still low, especially if the alloys is intended to be used as a "storage means" onto a transportation vehicle. As a matter of fact, for such application, an absorption capacity equal to 6 or more would be extremely attractive.

OBJECT AND SUMMARY OF THE INVENTION

The object of the present invention is to provide a new material which is at least as efficient for reversibly storing hydrogen as the Ni-based alloys disclosed in Canadian patent application no 2,117,158, but which significantly enhances the hydrogen storage capacity of such alloys when used as absorbent medium for storing hydrogen in the form of hydride.

More particularly, the invention provides a new very light-weight material capable of reversibly storing hydrogen with very good kinetics. This new material is of the formula:

$$(M_{1-x}A_x)D_y$$

wherein:

M is Mg, Be or a combination thereof;

A is at least one element selected from the group consisting of Li, Ca, Ti, V, Cr, Mn, Fe, Co, Ni, Cu, Zn, Al, Y, Zr, Nb, Mo, In, Sn, 0, Si, B, C and F (preferably Zr, Ti and Ni);

D is at least one metal selected from the group consisting of Fe, Co, Ni, Ru, Rh, Pd, Ir and Pt (preferably Pd);

x is a number (atomic fraction) ranging from 0 to 0.3; and y is a number (atomic fraction) ranging from 0 to 0.15 (preferably from 0 to 0.02).

This material is in the form of a powder of particles of the formula $M_{1-x}A_x$ having an average size ranging from 0.1 to 100 $\mu$m. Each particle may consist of nanocrystalline grains having an average size of 3 to 100 nm. Alternatively, each particle may have a nano-layered structure with a layer spacing of 3 to 100 nm. Some of the particles have clusters of at least one of the metals B attached thereto, each cluster having an average size ranging from 2 to 200 nm.

The invention also provides a process for preparing the new material defined hereinabove, and a method of use of the same for reversibly storing hydrogen and/or reversibly storing energy.

DETAILED DESCRIPTION OF THE INVENTION

As can be noticed, in the above formula, x can be equal to 0. In such a case, the particles consist of pure Mg, pure Be or a combination of them.

When x is not equal to 0, element A can be present in the particles in the following form:
as a solid solution in Mg, Be or a combination of them (equilibrium solid solution or supersaturated solid solution, or amorphized solid solution, or spinodally decomposed solid solution),
as a compound with Mg or Be, appearing as precipitates or grain-boundary phases (equilibrium or metastable),
as clusters, particles or layers of a separate phase.

Element D is attached in the form of clusters onto the particles of formula $M_{1-x}A_x$, Such element B is essentially a hydrogen dissociation catalyst whose purpose is to increase the absorption kinetics. In practice, element D can be attached to the surface of the material mechanically or chemically. It would even be loose eventhough this is not preferred.

The material according to the invention can be prepared by mechanical grinding or mechanical alloying, substantially as is disclosed in the above mentioned Canadian patent application no 2,117,158. This process basically consists in intensely grinding a powder of metal M until the grain size of the crystallites reaches the requested value, or in intensely grinding a mixture of a powder of metal M with a powder of the other metal A in a steel or tungsten carbide crucible of a ballmill. Of course, the respective amounts of metal M and element A must be selected so as to obtain the requested chemical composition and microstructure of the particles. Such grinding allows the preparation in a mechanical way of the requested particles from powders of metal M and element A. It also allows the reduction of the grain size of these particles to the requested value. This process is particularly advantageous in that it is very simple and can be carried out at ambient temperature under atmospheric pressure. However, it is necessary that the grinding step be carried out under an inert atmosphere in order to avoid oxidation of the alloy that is being formed, unless such oxidation or another gas treatment is required (see the definition of element A, which is not limited to metals only). Once the main grinding step is completed and the requested particles are obtained, a given amount of the hydrogen dissociation catalyst B can be added to the particles and the resulting mixture can be subjected to an additional grinding step so as to apply clusters of the catalyst material onto the particles. This catalyst material is preferably palladium, platinum, iridium, ruthenium or rhodium, and more preferably palladium.

It is worth mentioning that other processes could be used as well to prepare the material according to the invention, like:

low energy ball milling
aerosol processes
gas phase condensation
sputtering or the combination of two or more of the above techniques.

After fabrication, the powder can be pressed to increase density of the material (formation of pellets or bulk samples).

Tests carried out by the inventors have shown that the material according to the invention exhibits exceptional hydrogenation behaviour. More particularly, such material has been found to reversibly absorb and desorb hydrogen at temperatures ranging from room temperature to high temperatures with very good kinetics at pressures for absorption ranging from several bars to high pressure. Reversible hydrogen absorption capacity as high as 7 wt.% was reached.

It has also been found that the material according to the invention does not need activation and is not sensitive to contamination or oxidation. Additionally, this material does not deteriorate mechanically upon cycling, and it exhibits no decrepitation.

As can be noted, the new material according to the invention is particularly useful as hydrogen absorbent medium, since it has a hydrogen absorption capacity as defined above, which is higher than 6. As a matter of fact, when x is equal or lower to 0.15 and y is close to 0, M is Be and A is a transition metal (3d), the hydrogen mass density (viz. the hydrogen absorption capacity) of the material is higher than 6, when one supposes a very conservative ratio of hydrogen to metal equal to 1. When x is 0 and thus the particles consist of pure nanocrystalline Mg or Be, an hydrogen absorption capacity as high as 7.6% for Mg and higher than 10% for Be can even be achieved.

This, of course, makes the material according to the invention very useful, especially as hydrogen storing means for use in transportation vehicle where the weight is a very important factor.

Moreover since the formation of a hydride with the material according to the invention is generally of heat in a reversible manner, thus material is also very useful for energy storage and related applications.

EXAMPLE

A composite material of the formula $(M_{1-x}A_x)D_y$ according to the invention where M is Mg, x is 0 and D is Pd, was prepared. This nanocrystalline Mg powder was fabricated by high energy ball-milling (impact grinding), and 1.5 wt% of Pd was added thereto as a catalyst (element B).

Figure 1:
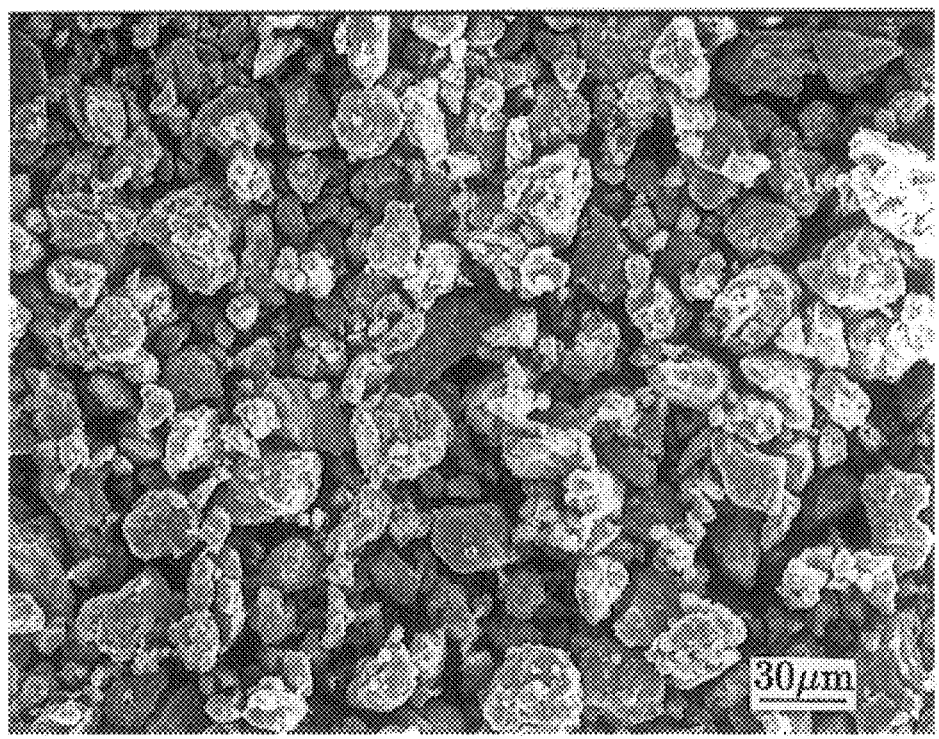
FIG. 1 is a scanning electron microscopy (SEM) micrograph of a powder of particles of the formula $M_{1-x}A_x$ according to the invention, where M is Mg and x is 0 (pure Mg powder), these particles having clusters of Pd attached thereto.
Figure 2:
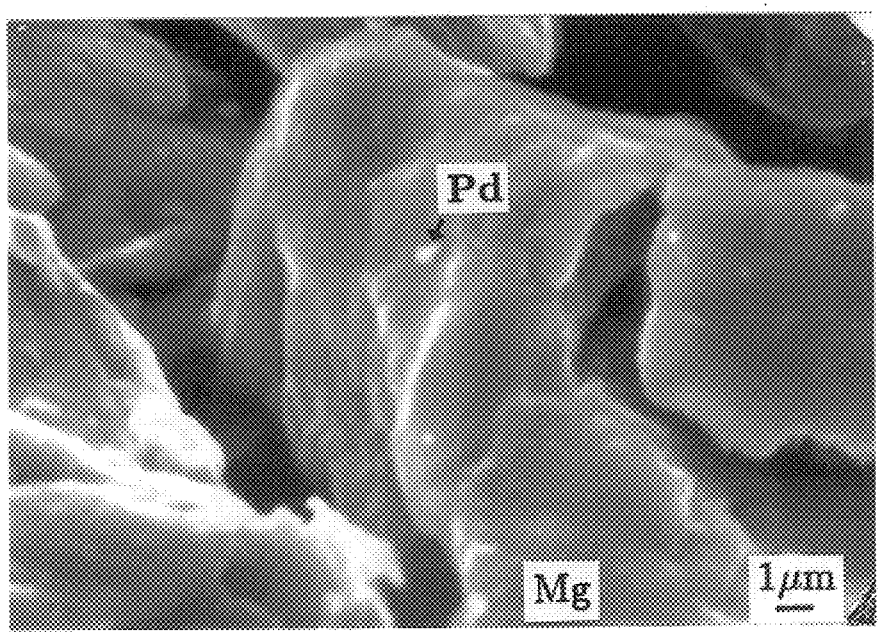
FIG. 2 is a high magnification micrograph of the powder shown in FIG. 1.
Figure 3:
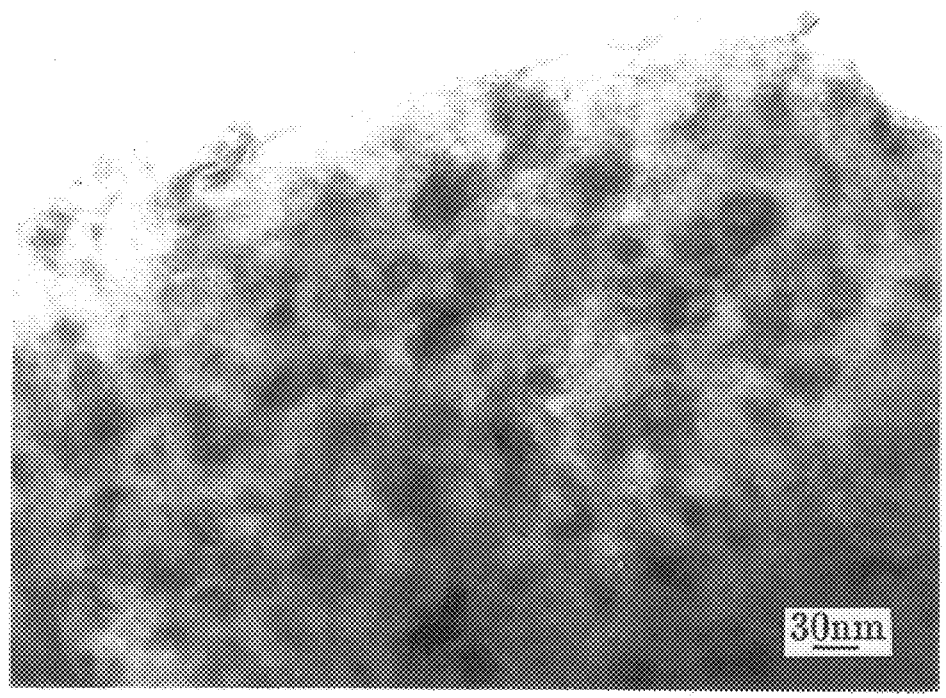
FIG. 3 is a transmission electron microscopy (TEM) micrograph of the powder of FIGS. 1 and 2, showing the nanocrystalline structure of the particles.
Figure 4:
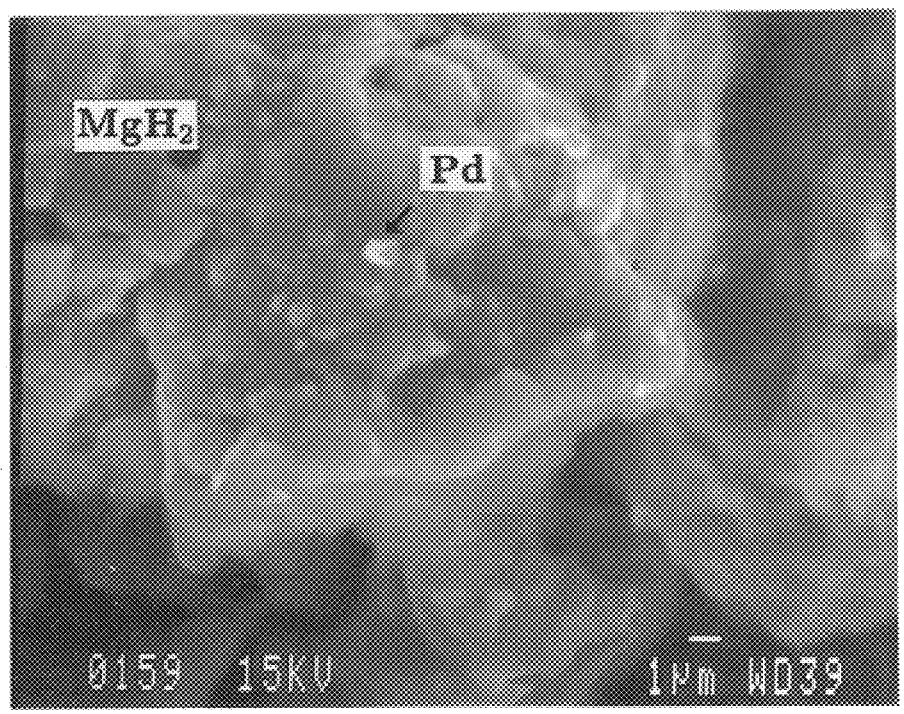
FIG. 4 is a micrograph similar to the one of FIG. 2, showing that the particles and clusters of Pd remain unchanged after hydrogenation.

The microstructure of the particles that were so obtained was investigated by x-ray diffraction, scanning electron microscopy (SEM) and transmission electron microscopy (TEM). FIG. 1 is a SEM micrograph of the Mg powder particles. At higher magnification, the particles of Pd on the surface of Mg powder can be seen, as shown in FIG. 2. The nanocrystalline structure of Mg can also been seen on the TEM micrograph shown in FIG. 3. After hydrogenation, the Pd particles remain unchanged as shown in FIG. 4

Figure 5:
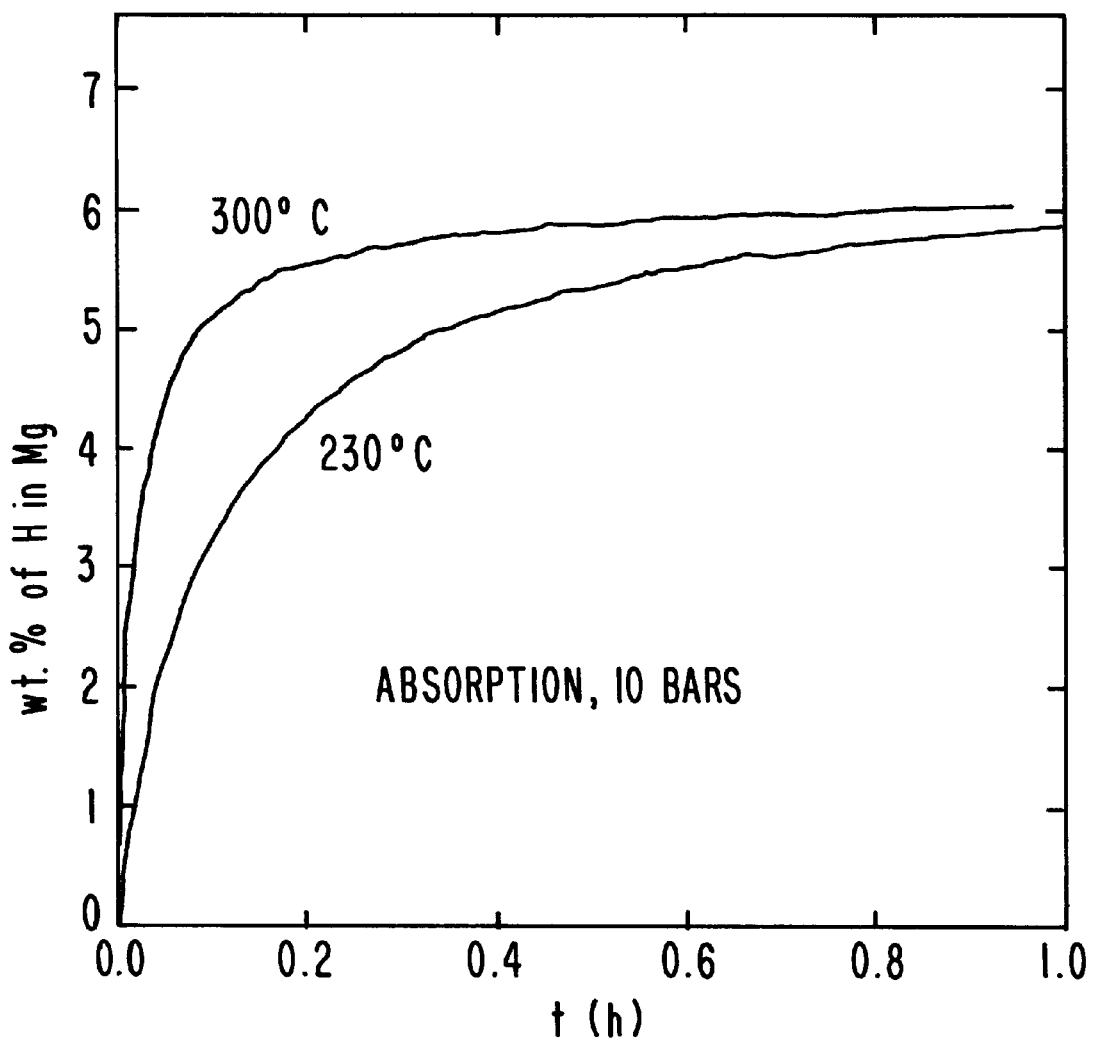
FIG. 5 is a curve giving the hydrogen absorption rate of the powder shown in FIGS. 1 to 4 at 230° C. and 300° C., respectively, under a pressure of 10 bar.
Figure 6:
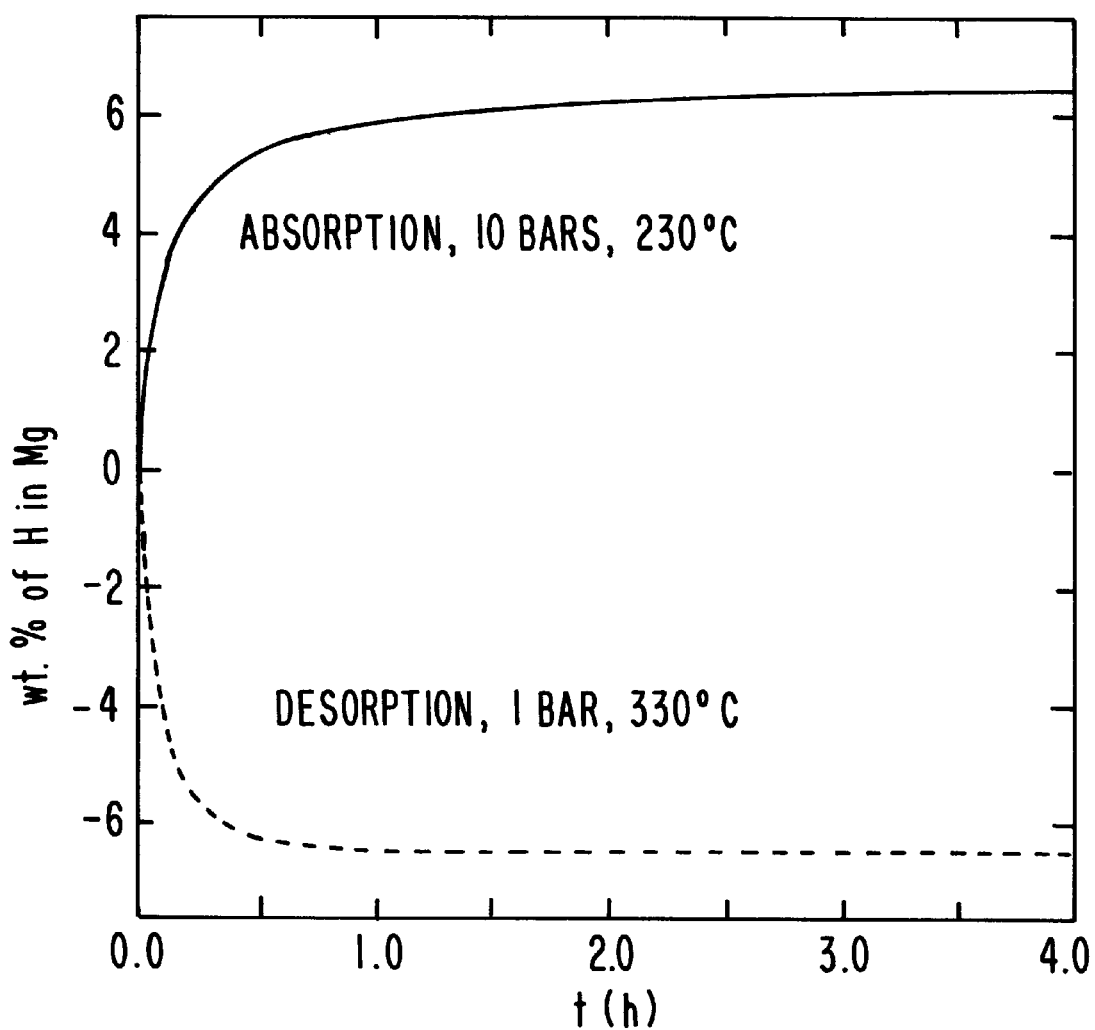
FIG. 6 is a curve giving the hydrogen absorption rate of the powder shown in FIGS. 1 and 4 at 230° C. under a pressure of 10 bars, and the hydrogen desorption rate of the same powder at 330° C. under a pressure of 1 bar.

After fabrication, the sample was placed in the sample holder of an automated gas titration apparatus. Then, the sample holder was evacuated and simultaneously heated up to 300° C. and hydrogen gas was admitted at pressure 10 bars. The rate of hydrogen absorption by the material is shown in FIG. 5, with a half time of absorption ($t_{1/2}$) equal to 1.4 min. The same experiment was carried out at 230° C. and the result is also reported in FIG. 5. As can be seen, at 230° C., the kinetics of hydrogen absorption is slightly slower, with the half reaction time ($t_{1/2}$) equal to 6.4 min. The maximum amount of absorbed hydrogen was equal to 6.6 wt.%, as shown in FIG. 6. The rate of hydrogen desorption at 330° C. under a pressure of 1 bar was also measured. The result is shown in FIG. 6 ($t_{1/2} \approx 3.7$ min).

We claim:
1. A material for gas-phase hydrogenation of the formula:

$$(M_{1-x}A_x) D_y$$

wherein:

M is Mg, Be or a combination thereof;

A is at least one element selected from the group consisting of Li, Ca, Ti, V, Cr, Mn, Fe, Co, Ni, Cu, Zn, Al, Y, Zr, Nb, Mo, In, Sn, O, Si, B, C and F;

D is at least one metal selected from the group consisting of Fe, Co, Ni, Ru, Rh, Pd, Ir and Pt;

x is a number ranging from 0 to 0.3; and y is a number ranging from 0 to 0.15;

said material being in a form of a powder of particles of a formula $(M_{1-x}A_x)$ wherein M, A and X are defined as above, said particles having an average size ranging from 0.1 to 100 µm, each of said particles consisting of nanocrystalline grains having an average size of 3 to 100 nm or having a nano-layered structure with a layer spacing of 3 to 100 nm, optionally some of said particles having clusters of said at least one metal D attached thereof, each of said clusters having an average size ranging from 2 to 200 nm, and wherein said material is produced by mechanical grinding.

2. The material of claim 1, wherein A is selected from the group consisting of Zr, Ti and Ni.

3. The material of claim 1, wherein D is Pd.

4. The material of claim 1, wherein x is 0.

5. The material of claim 1, wherein y ranges from 0 to 0.02.

6. The material of claim 1, wherein:

A is selected from the group consisting of Zr, Ti and Ni;

D is Pd; and y ranges from 0 to 0.02.

7. The material of claim 1, wherein M is Mg.

8. The material of claim 6, wherein M is Mg.

9. The material of claim 1, wherein M is Be.

10. The material of claim 6, wherein M is Be.

11. The material of claim 6, wherein M is a combination of Mg and Be.

12. A method of storing and/or transporting hydrogen, comprising:

providing a source of hydrogen;

bringing the hydrogen into contact with a material as defined in claim 1, for a time sufficient for the material to reversibly absorb hydrogen.

13. A method of storing and/or transporting hydrogen, comprising:

providing a source of hydrogen;

bringing the hydrogen into contact with a material as defined in claim 7, for a time sufficient for the material to reversibly absorb hydrogen.

14. A method of storing and/or transporting hydrogen, comprising:

providing a source of hydrogen;

bringing the hydrogen into contact with a material as defined in claim 8, for a time sufficient for the material to reversibly absorb hydrogen.

15. A method of storing and/or transporting hydrogen, comprising:

providing a source of hydrogen;

bringing the hydrogen into contact with a material as defined in claim 9, for a time sufficient for the material to reversibly absorb hydrogen.

16. A method of storing and/or transporting hydrogen, comprising:

providing a source of hydrogen;

bringing the hydrogen into contact with a material as defined in claim 10, for a time sufficient for the material to reversibly absorb hydrogen.

17. A process for preparing a material as defined in claim 1, comprising the steps of:

a) grinding a powder of a metal M as defined in claim 1, optionally in admixture with a powder of at least one element selected amongst the elements A defined in claim 1 in such amounts so as to obtain particles of the formula $(M_{1-x}A_x)$, said grinding allowing the preparation in a mechanical way of said particles from said powders, and b) once grinding step (a) is completed and said particles are obtained, optionally adding a given amount of said at least one metal D to said particles and subjecting the resulting mixture to an additional grinding shorter in time than the first one so as to apply clusters of said metal D onto at least some of said particles.

18. The process of claim 17, wherein M is Mg.

19. The process of claim 17, wherein M is Be.

20. The process of claim 17, wherein:

A is selected from the group consisting of Zr, Ti and Ni; and

D is Pd.

21. A material for gas phase hydrogenation according to claim 1, wherein the material is produced by a process comprising:

a) grinding a powder of a metal M as defined in claim 1, optionally in admixture with a powder of at least one element selected amongst the elements A defined in claim 1 in such amounts so as to obtain particles of the formula $(M_{1-x}A_x)$, said grinding allowing the preparation in a mechanical way of said particles from said powders, and b) once grinding step (a) is completed and said particles are obtained, optionally adding a given amount of said at least one metal D to said particles and subjecting the resulting mixture to an additional grinding shorter in time than the first one so as to apply clusters of said metal D onto at least some of said particles.

* * * * *

UNITED STATES PATENT AND TRADEMARK OFFICE
CERTIFICATE OF CORRECTION

PATENT NO. : 5,964,965
DATED : October 12, 1999
INVENTOR(S) : Robert SCHULZ et al.

It is certified that error appears in the above-identified patent and that said Letters Patent is hereby corrected as shown below:

cover, Item [54] Title of Invention, delete "MG or BE-BASED" and replace with --Mg or Be-BASED--;
that Column 1, line 1, delete "MG or BE-BASED" and replace with --Mg or Be-BASED--;
Column 2, line 4, delete "(75kg/mol.)" and replace with --75 kj/mol.)--;
Column 2, line 64, delete "low" and replace with --small--;
Column 3, line 50, delete "SPEC" and replace with "SPEX";
Column 4, line 29, delete "0." and replace with --O.--;
Column 6, line 9, delete "is generally of heat" and replace with --is generating heat--;
Column 6, line 10, delete "thus" and replace with --this--;
Column 6, line 44, delete "(element B)" and replace with --(element D)--.

Signed and Sealed this

Nineteenth Day of September, 2000

Attest:

Q. TODD DICKINSON

*Attesting Officer*

*Director of Patents and Trademarks*